May 5, 1959   A. MATHISEN   2,885,505
INERTIA OPERATED DEVICES
Filed Sept. 17, 1954

INVENTOR
Anders Mathisen
BY Mason, Mason & Sheridan
ATTORNEY

United States Patent Office 2,885,505
Patented May 5, 1959

2,885,505

INERTIA OPERATED DEVICES

Anders Mathisen, London, England, assignor of one-half to Graviner Manufacturing Company, Limited, London, England, a British company, and one-half to The Wilkinson Sword Company Limited, London, England, a British company Application September 17, 1954, Serial No. 456,719

Claims priority, application Great Britain September 23, 1953

9 Claims. (Cl. 200—61.53)

This invention relates to aircraft crash protection systems. More particularly, the invention relates to systems of the kind which operate automatically when the aircraft is subjected to a rapid deceleration, operation of the system resulting in discharge of fire extinguishing suppressant in desired locations, normally in the power plant zones.

The invention also relates to inertia switches for use in such systems.

Existing systems generally comprise inertia operated electric switches responsive to a predetermined deceleration of the aircraft in a horizontal plane corresponding to the normal level flight attitude of the aircraft, and satisfactory operation is dependent upon the deceleration in a crash having a substantial component in this plane. However, this condition may not always occur in a crash; thus in the case of a helicopter, for example, engine failure may cause the helicopter to drop vertically downwards for an appreciable distance, or it may crash into a hill or building whilst moving in a direction inclined to the aforesaid plane.

According to the present invention there is provided an inertia switch comprising means responsive to a predetermined deceleration occurring in any direction lying within a wide solid angle.

Such a switch may be used in an aircraft crash protection system and be arranged to respond to a predetermined deceleration in any direction in or below a horizontal plane corresponding to the normal level flght attitude of the aircraft.

Whilst the helicopter has been quoted as a particular instance in which existing systems are not satisfactory, it is to be understood that the present invention is not limited in application to helicopters but is also applicable to other forms of aircraft.

Figure 1:
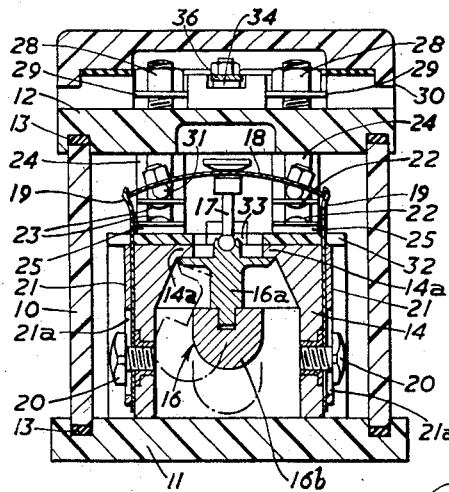
Figure 2:
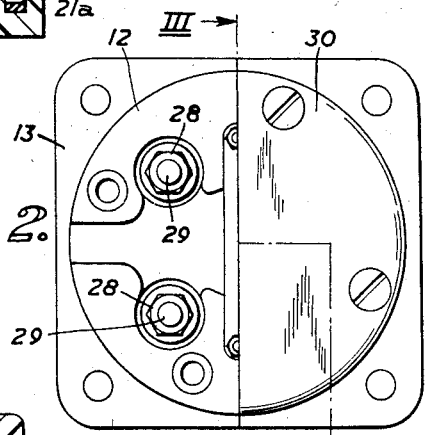
Figure 3:
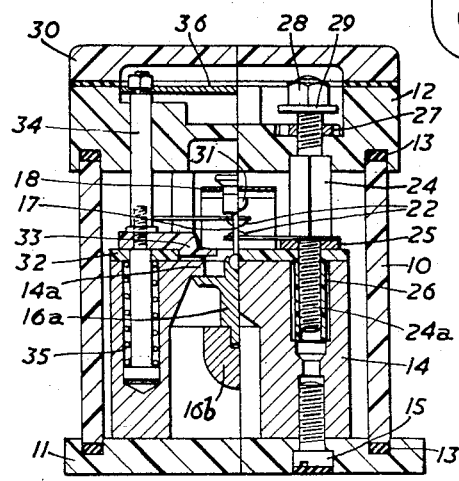

A typical aircraft crash protection inertia switch in accordance with the invention, will now be described by way of example only, with reference to the accompanying drawings, in which:

Figure 1 is a sectional side elevation through the centre of the inertia switch, Figure 2 is a plan view of the switch shown in Fig. 1, half of the cover being shown removed in this view, whilst Figure 3 is a sectional view taken along the line III—III in Figure 2.

Referring now to the drawings the switch is enclosed in a case consisting of a tube 10 of transparent plastic material the ends of which fit in circular grooves in a base 11 and top plate 12 which are both of insulating material, an O-ring washer 13 being housed in each groove to form a dust seal. A metal body 14 of rectangular cross section is secured to the base 11 by screws, one of which 15 can be seen in Figure 3. A recess formed in the body 14 accommodates a bob 16 which is composed of an upper part 16a of a light alloy welded to a lower part 16b of a heavy alloy, the latter being for example of the kind sold under that name by the General Electric Company Limited. This construction gives the bob 16 a lower centre of gravity than would be the case if it was all of the same material. The upper part 16a is formed with a knife-edged flanges which in the normal position of the switch seats against shoulders 14a formed in the body 14. The bob 16 is pivotally suspended from the ball-shaped lower end of a tie rod 17 which passes through an aperture in the centre of a bow spring 18, the upper end of the tie rod being enlarged so that it hangs freely from the bow spring 18. Each end of the bow spring 18 is captured in the free end of a leaf spring 19, the two leaf springs 19 being secured on opposite sides of the body 14 by screws 20. Interposed between each screw 20 and its associated leaf spring 19 is a clamping piece 21 which is slotted at 21a so that its position can be adjusted to vary the inwardly directed pressure applied by the leaf spring to the associated end of the bow spring 18.

The switch is provided with two pairs of normally open spring contacts 22, 23 the end of each spring being secured between a spacer member 25 and the central portion of a stud 24 whose lower threaded end 24a (Fig. 3) engages in an insert 26 of insulating material located in the body 14. The spacer members 25 rest on a plate 32 of insulating material which covers the top of the body 14. Two beads 31 of insulating material are secured to the bow spring 18 and are so positioned that when the bow spring 18 snaps over-centre they each engage one of the upper contacts and move it into engagement with the associated lower contact. The upper end of each stud 24 is also threaded and is engaged by a locknut 27 which serves to secure the top plate 12 to the base 11 with the tube 10 therebetween. By means of a further nut 28 and washer 29 an electrical lead can be secured to the stud 24 and thus connected electrically to the associated contact 22 or 23. A cover 30 is provided.

The switch is designed to be mounted so that the plane defined by the under surface of the shoulder 14a is approximately horizontal when the aircraft is in its normal level flight attitude. Deceleration of sufficient magnitude in a vertically downward direction will cause the bob 16 to drop away from the shoulder 14a and pull the bow spring 18 over centre thereby causing closure of the pairs of contacts 22, 23. Deceleration in any other direction in or below the aforesaid plane will cause the bob 16 to pivot about the knife-edged flange and likewise snap-over the bow spring 18. The recess formed in the body 14 adjacent the shoulder 14a is flared outwardly in a downward direction to permit pivoting of the bob.

It will be understood that movement of the bob is opposed by the resilience of the bow-spring and by the restraint imposed upon its movement by the inwardly directed pressure applied by the two supporting leaf-springs 19, so that the deceleration at which the bow-spring snaps over is dependent upon this opposition, and also upon the ratio of the radius of the flange to the distance between the periphery of the knife-edged flange and the centre of gravity of the bob.

By suitable design of the switch it has been found possible to get the value of deceleration at which operation occurs substantially uniform over a solid angle of at least 180°. For example, with the switch set to operate at a deceleration of 3 $g$ in a vertical or horizontal direction the variation from this value of the deceleration at which operation occurs in other directions may be limited to about ½ $g$. Moreover, it is possible to set the switch for operation at any $g$ setting within a wide range simply by adjustment of the clamping pieces 21. In the switch shown in the drawings, which is drawn to scale, the main dimensions of the inertia element were approximately as follows:

| | Inches |
|---|---|
| Distance between centre of bow spring and centre of ball end of tie rod | 7/16 |
| Diameter of knife-edged flange | 5/8 |
| Distance between centre of ball end of tie rod and bottom of bob | 3/4 |

Resetting of the switch is effected by means of two claws 33 which are mounted on posts 34, the lower end of each post 34 fitting in a hole in the body 14. Each post 34 is urged in a downward direction by a spring 35 so that the claws 33 normally rest on the plate 32. The upper end of the two posts 34 are united by a metal strap 36, and to reset the switch it is merely necessary to pull this strap 36 upwards so that the claws 33 lift the bow spring 18 and snap it over to its upper position.

It has already been stated that the enlarged upper end of the tie rod 17 rests on the bow spring 18. The aperture in the latter is of such size that, after the bow spring has snapped over as a result of movement of the bob 16, subsequent return movement of the bob 16 will not re-set the bow spring 18 because the tie rod 17 is free to move upwards through the aperture.

Each pair of contacts may be connected in independent extinguisher firing circuits, or one or both pairs of contacts, or additional contacts, may be used to perform other desired operations such as switching off the ignition or the fuel supply or operating emergency equipment.

What I claim is:

1. In an inertia switch, a base, a hollow body mounted on said base, said hollow body having shoulders at that end of said hollow body which is remote from said base, an inertia element, resilient means mounted on said hollow body, said inertia element being suspended from said resilient means, and a flange on said inertia element, said flange normally resting against said shoulders.

2. In an inertia switch, a base, a hollow body mounted on said base, said hollow body having a top wall located remote from said base and having an aperture extending through said top wall, a bow spring, said bow spring being supported from said hollow body with its midportion positioned over said aperture, a tie rod suspended by one end from the mid-portion of said bow spring and extending into said aperture, an inertia element pivotally mounted on the other end of said tie rod, said inertia element lying within said hollow body and resting against the underside of said top wall when the centre of said bow spring is bowed away from said base, and a pair of electric contacts, said contacts being brought into engagement by movement of the centre of said bow spring towards said base.

3. An inertia switch according to claim 2 comprising two resilient leaf springs extending from said hollow body, each leaf spring supporting one end of said bow spring.

4. In an inertia switch, a suspended inertia element, said inertia element comprising an upper part composed of a metal alloy and a lower part composed of a metal alloy, the metal alloy of which the lower part is composed being of substantially greater density than the metal alloy of which the upper part is composed.

5. In an inertia switch, a base, a snap-action resilient member supported from said base, an inertia element, a tie-rod, said tie-rod having one end secured to said resilient member, said inertia element being pivotally suspended from the other end of said tie-rod whereby rapid deceleration of said base causes movement of said inertia element relative thereto which snaps over said resilient member, and a pair of electric contacts, said contacts being in electrical contact with one another when said resilient member is in the snapped-over condition.

6. In an inertia switch, a base, a member fixed relative to said base, said member having a plane bearing surface facing said base, a two-position snap-action resilient member also fixed relative to said base, and an inertia element pivotally suspended from said snap action resilient member, said inertia element resting against said plane bearing surface in one position of said snap-action member, rapid deceleration of said base causing said inertia element to move relatively thereto and thereby change over said snap-action resilient member to its other position.

7. An inertia switch according to claim 6, comprising a pair of normally open electric contacts, movement of said resilient element from said one position to said other position causing closure of said contacts.

8. In an inertia switch, a hollow body, said hollow body having an aperture extending through its upper wall, two leaf springs secured to opposite sides of said hollow body, one end of each leaf spring extending above the upper wall, a bow spring, each end of said bow spring being supported by the said one end of one of said leaf springs respectively, a tie rod suspended from a central portion of said bow spring, an inertia element suspended from the lower end of said tie rod, said inertia element lying within said hollow body and having a knife edged flange adapted to bear against the inner surface of a wall of said hollow body, the remaining surfaces of said inertia element being spaced from the interior of said hollow body, and a movable claw adapted to be lifted to engage said bow spring when said bow spring is bowed towards said upper wall and thereby to move said bow spring to the oppositely bowed position.

9. In an inertia switch, a hollow body, said hollow body having an opening in one wall of the body, an inertia element, said inertia element being located within the hollow interior of said body, resilient means, said inertia element being suspended from said resilient means and being urged by said resilient means into engagement with said wall whereby said inertia element extends across said opening, the dimensions of said inertia element being such that there is a substantial clearance between said inertia element and the inner walls of said hollow body except for the aforesaid engagement with said one wall, whereby when said switch is subjected to a predetermined inertia said inertia element can move away from said one wall or pivot relative to said wall against the opposing force of said resilient means, and a pair of electric contacts, said contacts being brought into electrical contact with one another when said inertia element moves relative to said one wall.

References Cited in the file of this patent

UNITED STATES PATENTS

| 1,745,909 | Paulus et al. | Feb. 4, 1930 |
|---|---|---|
| 1,840,986 | Townsend | Jan. 12, 1932 |
| 2,093,414 | Burgan | Sept. 21, 1937 |
| 2,385,825 | Mathisen | Oct. 2, 1945 |
| 2,671,832 | Hansord et al. | Mar. 9, 1954 |

FOREIGN PATENTS

| 635,672 | Great Britain | Apr. 12, 1950 |